UNITED STATES PATENT OFFICE.

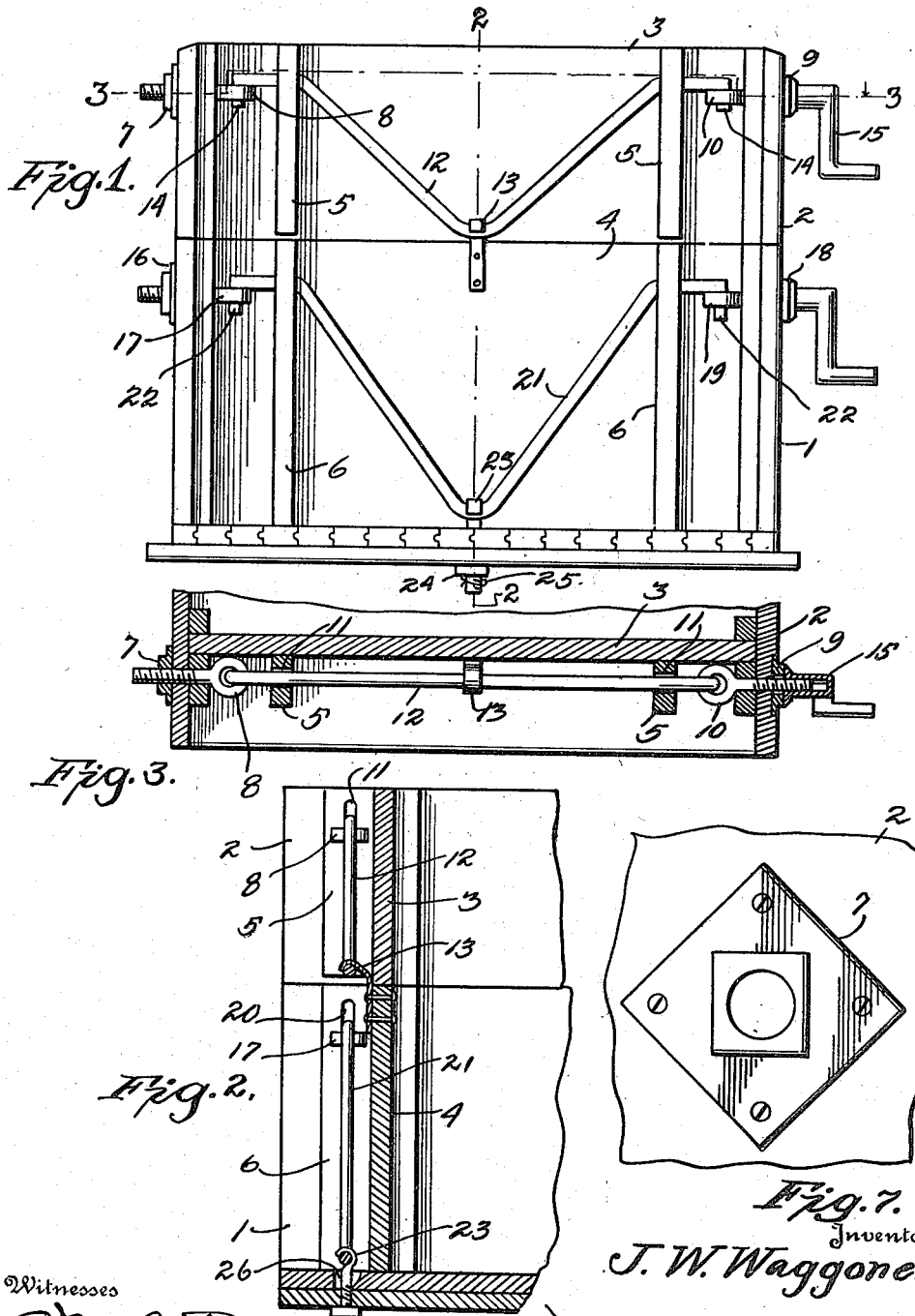

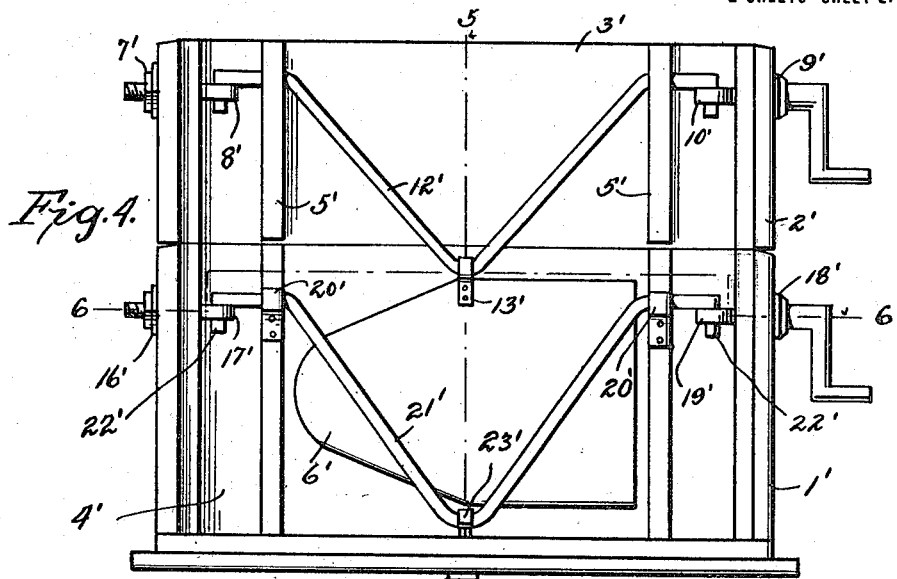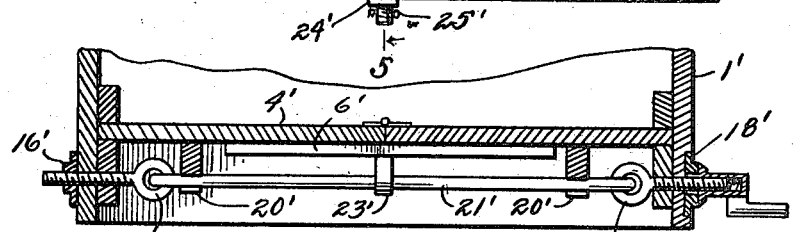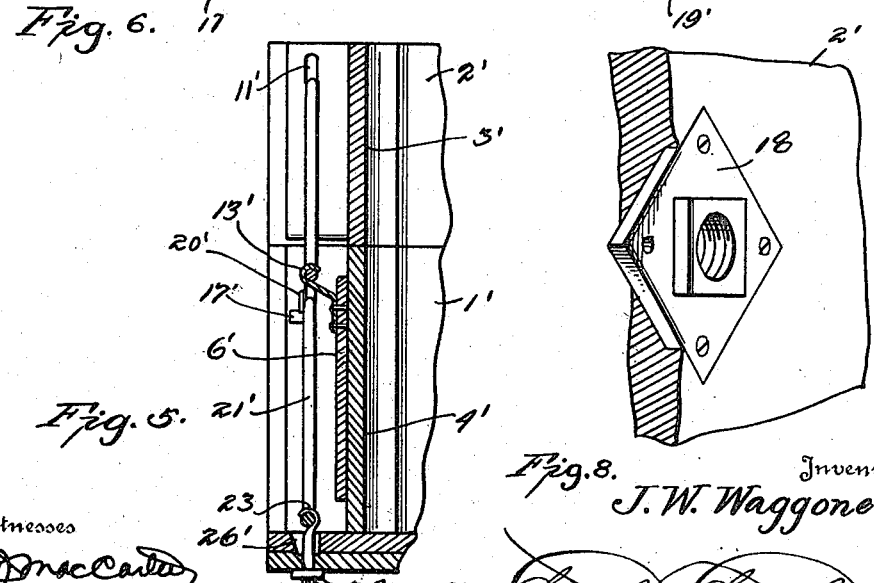

JAMES W. WAGGONER, OF MOUNTAIN VIEW, OKLAHOMA.

END-GATE FASTENER FOR WAGONS.

1,209,523.  Specification of Letters Patent.  Patented Dec. 19, 1916.

Application filed June 14, 1915. Serial No. 33,949.

*To all whom it may concern:*

Be it known that I, JAMES W. WAGGONER, a citizen of the United States, residing at Mountain View, in the county of Kiowa, State of Oklahoma, have invented certain new and useful Improvements in End-Gate Fasteners for Wagons; and I do hereby declare the following to be a full, clear, and exact description of the invention, such as will enable others skilled in the art to which it appertains to make and use the same.

This invention relates to an end gate fastener for wagons.

An object of the invention resides in the provision of a device by means of which the end gate of a wagon will be securely held in place and absolutely prevented from rattling.

A further object of the invention resides in the provision of a device that will hold the upper side boards of a wagon in place and prevent them from rattling.

A further object of the invention resides in so constructing the device that the end gate and side boards may be simultaneously clamped in place.

With these and other objects in view, such as will appear as the description progresses, my invention comprises the combination and arrangement of parts as set forth in and falling within the scope of the appended claims.

Referring to the drawing: Figure 1 is an elevational view of the front portion of a wagon with my device in place thereon. Fig. 2 is a vertical sectional view on line 2—2 of Fig. 1. Fig. 3 is a horizontal sectional view on line 3—3 of Fig. 1. Fig. 4 is an elevational view of the rear end of a wagon with my device in place thereon. Fig. 5 is a section on line 5—5 of Fig. 4. Fig. 6 is a section on line 6—6 of Fig. 4. Fig. 7 is a fragmental detail of the lock nut on one side of the wagon. Fig. 8 is a similar view of the lock nut when used as a washer on the other side of the wagon.

Referring to the drawing wherein like parts are indicated by like characters throughout the several views:—In Figs. 1, 2 and 3 of the drawing, I have illustrated a wagon which includes lower side boards 1, upper side boards 2 and end gates 3 and 4, which are provided with braces 5 and 6.

In order that the side boards and end gates may be securely clamped in place and prevented from rattling, I have secured a threaded plate 7 to one of the upper side boards and adjustably connected a threaded eye 8 thereto. On the other upper side board, I have countersunk a plate 9 similar to the plate 7 and adjustably mounted a threaded eye 10 therein. Extending through elongated slots 11 in the braces 5 and 6 is a bar 12 which is of V-shape formation and is engaged at its vertex by an outwardly opening hook 13 secured to the lower end gate 4. The upper ends of this bar are provided with vertically extending fingers 14 which pass through the eyes 8. Adjustably mounted on the end of the eye 10 is a tightening handle 15 by means of which the side boards 2 may be drawn together to tightly bind the end gate 3.

Secured to the outer face of one side board 1 is a threaded plate 16 having an eye 17 adjustably mounted therein and countersunk in the outer face of the other side board 1 is a similar plate 18 which has an eye 19 mounted therein on which is a tightening handle. Extending through elongated apertures 20 in the braces 6 is a V-shaped rod 21, the ends of which are turned downwardly forming fingers 22 which extend into the eyes 17 and 19. The rod 21 is engaged at its vertex by a hook 23 which extends through the bottom of the wagon and has a nut 24 thereon which is prevented from displacement by a cotter pin 25. A depression 26 is formed in the bottom of the wagon for the reception of the hook 23 when it is disengaged from the rod 21.

In Figs. 4 to 8, inclusive, I have disclosed the rear end of the wagon which consists of lower side boards 1′, upper side boards 2′, an upper end gate 3′ and a lower end gate 4′ the upper gate having braces 5′ thereon.

The construction of the tightening means for the upper end gate is similar to that described in connection with the gate 3 and it is not, however, advisable to enter into a detailed description of the same. The parts are, however, indicated by the characters used in connection with Figs. 1 and 3 primed. The lower end gate 4′ is provided with a cleat 6′. Secured to the outer face of one side board 1′ is a threaded plate 16′ which has an eye 17′ adjustably mounted thereon, while countersunk in the outer face of the other side board 1′ is a similar plate 18′ which has an eye 19′ mounted thereon.

Supported by brackets 20', is a bar 21' which has fingers 22' extending into the eyes 17' and 19' and the bar is engaged at its vertex by a hook 23' which has a nut 24' thereon which is held in place by a cotter pin 25'. A depression 26' is formed in the bottom of the wagon for the reception of the hook 23' when it is disengaged from the bar 21'. The bar 12' is engaged by a hook 13' which opens forwardly and is mounted on the cleat 6'. On the outer end of the eye 19' is an adjusting handle similar to the handle 15'.

Inasmuch as the operation of both the embodiments is substantially the same, I will only describe the operation of the form shown in Figs. 1 to 3. After the parts have been put in place as illustrated in the drawings the nut 24 is turned so that the bar 21 will draw the end gate 4 tightly onto the bottom of the wagon and the hook 13 will in turn draw the end gate 3 tightly onto the end gate 4. The handles on the eyes 10 and 19 are then operated to draw the side boards tightly into engagement with the end gates. The end gates and side boards will thus be clamped in place and prevented from rattling.

It is obvious that the upper end gate in each form as well as the side boards may be removed and yet the lower end gate and side boards will be firmly clamped in place. When it is desired to remove the lower end gate the hook 23 may be disengaged from the bar 21 and the fingers 22 from the eyes 17 and 19 at which time the end gate may be bodily removed. The hook 23 will then drop into the depression 26 and will not interfere with the dumping of the cereal or other material from the wagon.

From the foregoing description it will be seen that I have provided an end gate fastener which will securely maintain the upper and lower end gates and the side boards in position and prevent them from rattling. I have so constructed the device that the upper side boards and end gate may be removed.

While I have illustrated and described a particular embodiment of my invention, I have merely done so for the sake of convenience and I do not wish to be limited to that particular embodiment as it is obvious that numerous changes may be made within the details of construction thereof without in any way departing from the spirit of the invention or exceeding the scope of the appended claims.

What I claim is:—

1. In an end gate fastener adapted to secure a pair of end gates in place, a V-shaped locking bar for the upper end gate, eyes engaging the ends of the locking bar and adjustably engaged with the side boards, a hook for securing the locking bar to the lower end gate, means for drawing the side boards in engagement with the lower end gate, and means for drawing the lower end gate in engagement with the bottom of the wagon.

2. In an end gate fastener adapted to maintain a pair of end gates in place on a wagon in superposed relation, means for drawing the upper side boards of the wagon tightly into contact with the ends of the upper end gate, means for drawing the lower side boards of the wagon tightly into engagement with the ends of the lower end gate, means for fastening the first mentioned means positively to the lower end gate and means for adjustably and positively fastening the last mentioned tightening means for the lower side boards of the wagon to the bottom of the wagon.

In testimony whereof, I affix my signature, in the presence of two witnesses.

JAMES W. WAGGONER.

Witnesses:
D. W. STUDY,
C. W. CHRISTIAN.

Copies of this patent may be obtained for five cents each, by addressing the "Commissioner of Patents, Washington, D. C."